(12) United States Patent
Pike et al.

(10) Patent No.: US 7,870,788 B2
(45) Date of Patent: *Jan. 18, 2011

(54) FABRICATION PROCESS AND PACKAGE DESIGN FOR USE IN A MICRO-MACHINED SEISMOMETER OR OTHER DEVICE

(75) Inventors: William T. Pike, London (GB); Ian Standley, Claremont, CA (US)

(73) Assignee: Kinemetrics, Inc., Pasadena, CA (US)

( * ) Notice: Subject to any disclaimer, the term of this patent is extended or adjusted under 35 U.S.C. 154(b) by 1242 days.

This patent is subject to a terminal disclaimer.

(21) Appl. No.: 11/414,866

(22) Filed: May 1, 2006

(65) Prior Publication Data

US 2008/0282802 A1    Nov. 20, 2008

Related U.S. Application Data

(63) Continuation-in-part of application No. 10/851,029, filed on May 21, 2004, now Pat. No. 7,036,374, which is a continuation-in-part of application No. 10/058,210, filed on Jan. 25, 2002, now Pat. No. 6,776,042.

(51) Int. Cl.
G01P 15/125 (2006.01)
G01H 11/00 (2006.01)

(52) U.S. Cl. .................... 73/514.32; 73/514.17; 73/649

(58) Field of Classification Search .............. 73/514.32, 73/514.17, 514.18, 514.38, 649, 514.16, 73/514.29

See application file for complete search history.

(56) References Cited

U.S. PATENT DOCUMENTS

| 6,808,955 | B2 | 10/2004 | Ma | |
| 6,852,926 | B2 | 2/2005 | Ma | |
| 6,857,183 | B2 | 2/2005 | Famworth | |
| 6,883,638 | B1 * | 4/2005 | Maxwell et al. | 181/102 |
| 6,900,702 | B2 | 5/2005 | Youngner | |
| 6,903,452 | B2 | 6/2005 | Ma | |
| 6,916,731 | B2 | 7/2005 | Shimokawa | |
| 7,030,432 | B2 | 4/2006 | Ma | |
| 7,036,374 | B2 * | 5/2006 | Pike et al. | 73/514.32 |
| 7,406,002 | B2 * | 7/2008 | Schleisiek et al. | 367/182 |

* cited by examiner

*Primary Examiner*—Helen C. Kwok
(74) *Attorney, Agent, or Firm*—Trojan Law Offices

(57) ABSTRACT

An accelerometer or a seismometer using an in-plane suspension geometry having a suspension plate and at least one fixed capacitive plate. The suspension plate is formed from a single piece and includes an external frame, a pair of flexural elements, and an integrated proof mass between the flexures. The flexural elements allow the proof mass to move in the sensitive direction in the plane of suspension while restricting movement in all off-axis directions. Off-axis motion of the proof mass is minimized by the use of intermediate frames disbursed within and between the flexural elements. Intermediate frames can include motion stops to prevent further relative motion during overload conditions. The device can also include a dampening structure, such as a spring or gas structure that includes a trapezoidal piston and corresponding cylinder, to provide damping during non-powered states. The capacitive plate is made of insulating material. A new method of soldering the capacitive plate to the suspension plate is also disclosed.

19 Claims, 16 Drawing Sheets

FABRICATION PROCESS AND PACKAGE DESIGN FOR USE IN A MICRO-MACHINED SEISMOMETER OR OTHER DEVICE

PRIORITY CLAIM

This application is a continuation-in-part of a prior application Ser. No. 10/851,029 entitled "IMPROVED MICRO-MACHINED SUSPENSION PLATE WITH INTEGRAL PROOF MASS FOR USE IN A SEISMOMETER OR OTHER DEVICE" filed on May 21, 2004, now U.S. Pat. No. 7,036,374 which is a continuation-in-part of application Ser. No. 10/058,210, filed on Jan. 25, 2002, now a U.S. Pat. No. 6,776,042.

INCORPORATION BY REFERENCE

This Application specifically incorporates by reference the subject matter and complete text of the related U.S. Pat. No. 6,776,042 entitled "MICRO-MACHINED ACCELEROMETER".

FIELD OF THE INVENTION

The invention relates to seismic instrumentation in general. More particularly, the invention is related to improved fabrication and packaging techniques for a micro-machined suspension plate having an integral proof mass and a method of fabrication for the same that may be utilized in a seismometer (velocimeter), an accelerometer, or other similar device.

DESCRIPTION OF THE PRIOR ART

U.S. Pat. No. 6,776,042 discloses a novel construction of an accelerometer or seismometer using an in-plane suspension geometry having a suspension plate and at least one fixed capacitive plate. In contrast to conventional seismometers, which utilize a spring supporting a distinct proof mass on an external frame, the micro-machined suspension plate is formed from a single piece of material to include the external frame, a pair of flexural elements and an integral proof mass interposed between the flexures. The flexural elements allow the proof mass to move in one direction, the sensitive direction, in the plane of suspension, while restricting as far as possible movement in all the other off-axis directions.

The new in-plane design also includes a displacement transducer for determining relative motion of the proof mass. This transducer includes accurately placed drive electrodes, preferably positioned on the proof mass, and corresponding pickup electrodes located on the fixed capacitive plate.

The device further includes either electrostatic or electromagnetic actuators that can be used within an electronic control loop to re-center the proof mass by exerting a restoring force in a so called force re-balance control system.

U.S. patent application Ser. No. 10/851,029 entitled "IMPROVED MICRO-MACHINED SUSPENSION PLATE WITH INTEGRAL PROOF MASS FOR USE IN A SEISMOMETER OR OTHER DEVICE" discloses improvements to the basic design including adding intermediate frames disbursed within and between the flexural elements in order to produce a system where the frequency of the off-axis modes are as many multiples as possible of the resonant frequency of the system, while minimizing the reduction in the frequencies of spurious modes along the sensitive axis.

The intermediate frames are provided with motion stops, so that under overload conditions the frames engage each other, preventing further relative motion, before the flexures make any contact or become overstressed. These stops thus minimize the chance of fracture or the irreversible surface bonding of portions of the flexure ("stiction").

The structure includes a dampening structure that is highly effective during non-powered/non-operational states (i.e. when the feedback control system is not powered and does not provide any dampening). This dampening structure includes a spring/gas dampening structure configured to provide damping during non-powered states.

For the packaging of such a device, it is well known that melted solder balls can be used to form conducting interconnects off a microelectronic device (chip) and between chips. This knowledge is widely used to bond, and form electrical connections between, a chip and a substrate. The substrate generally provides conductive paths to and from the chip, or chips, bonded in this way to it. This technique has been extended to the packaging of micro-electro-mechanical (MEMS) devices (U.S. Pat. Nos. 6,808,955, 6,852,926, 6,903,452, and 7,030,432) in which as well as producing electrical and mechanical interconnects, the solder balls are disposed between two wetting rings on separate MEMS substrates, so that reflow of the solder balls forms a contiguous ring producing a sealed cavity. A design that uses solder balls to both form a seal and control the spacing of the substrates, has not been presented.

The use of apertures through a frame to position solder balls onto a substrate is known (U.S. Pat. No. 6,857,183). The use of a carrier to hold solder balls within recesses using a vacuum force is also known (U.S. Pat. No. 6,916,731). Controlling the depth of the frame, or recess, to allow only one solder ball to occupy the desired position has been explained in both U.S. Pat. Nos. 6,857,183 and 6,916,731. Neither of these techniques has been extended to the scale of the current invention. Furthermore, there is no prior art for self-aligning the solder balls directly on the substrate to be bonded.

The use of thin micro machined bridges to support MEMS structures while thermally isolating them from their environment is known (U.S. Pat. No. 6,900,702). However, the design for a device that provides maximum thermal isolation utilizing a minimum of substrate area, and maximizing mechanical rigidity, has not been presented.

SUMMARY OF THE INVENTION

The present invention is a further improvement upon the invention of the U.S. application Ser. No. 10/851,029, describing an off-axis motion of the proof mass is minimized through the use of intermediate frames. The '029 application, in turn, improves upon the design set forth in U.S. Pat. No. 6,776,042 by utilizing intermediate frames. The number of frames to be used is determined as a function of both the desired bandwidth over which spurious modes are to be eliminated and the desired operational parameters of the system. More particularly, as the number of frames is increased, the off-axis spurious resonant modes are pushed up in frequency, thus increasing the overall effective bandwidth over which the device may operate without the occurrence of any spurious resonant frequencies. However, as the number of frames is increased, the frequency of spurious modes along the sensitive axis is reduced, due to the additional mass of the frames. Accordingly, a balance is struck between the desired elimination of off-axis and on-axis spurious resonant frequencies over an operational.

The intermediate frames can be provided with motion stops, so that under overload conditions the frames engage each other, preventing further relative motion, before the flexures make any contact or become overstressed. These stops thus minimize the chance of fracture or the irreversible surface bonding of portions of the flexure ("stiction").

The invention also preferably includes a dampening structure. In a preferred embodiment, the structure preferably includes a trapezoidal shaped piston and a corresponding engagement cylinder. The damping structure is positioned to engage between the outermost intermediate frame and the external frame as the springs are overloaded. In this way, and as explained earlier, the piston or cylinder is placed at a traversal distance which extends further than any intermediate flexural elements such that it will not make contact with any of these flexural elements. The piston or cylinder faces outward, and a corresponding cylinder or piston is then positioned on the inner surface of the outer frame of the suspension plate, facing inward toward the proof mass.

As the most outward intermediate frame approaches the inner surface of the outer frame of the suspension plate, the piston will engage the cylinder, thereby providing a dampening effect before the intermediate frame can contact the surface of the external frame of the suspension. In a preferred embodiment where the suspension plate is contained and submersed within a gaseous environment, the pressure of the gas will increase within the confined space of the cylinder as the piston moves further into the cylinder. The resulting viscous gas flow will act as a damping force, slowing the outer intermediate frame away from the external frame of the suspension. In an alternative embodiment where no gas is used, the piston and cylinder may be coupled using a dissipative material disposed between the piston and the cylinder such that the material is compressed as the piston moves further into the cylinder, thereby providing a damping force which slows the motion of the outer intermediate frame toward the external frame.

As a further improvement, the present invention involves a technique of biasing the springs by the geometrical arrangement of the mask to ensure that the proof mass is centered when the device is orientated at the so called Galperin angle of 54.7 degrees to the vertical. This configuration allows the construction of an orthogonal tri-axial sensor array utilizing identical spring mass systems, this is a particularly important factor for economically producing these devices as batch fabricated devices on a single wafer as only one configuration of devices is required to produce a sensor capable of sensing the vector field of the velocity or acceleration.

An additional fabrication improvement is to utilize an insulating material such as glass to produce the capacitive plate (s). By constructing the displacement transducer pick-up capacitor as a symmetric differential metal pattern and using an insulator rather than a semiconductor as the substrate the effects of stray capacitances can be significantly reduced and the remaining stray elements are balanced between the two capacitive pick-up arrays. Using the same thickness insulator for either two capacitive plates or one capacitive plate and a backing plate ensures no bending moments are generated as a result of mismatches in thermal expansion between the capacitive plates and the suspension plate.

The fabrication of three-dimensional shapes in insulators such as glass is not economical using the DRIE methods used to form the suspension plate. However, the techniques of micro-abrasion using a stream of abrasive particles carried in a high velocity gas jet can be used to create the features required in brittle materials such as glass and ceramics.

In order to allow wafer level fabrication of a sandwich of capacitive plate, suspension plate, and capacitive plate or backing plate it is necessary that the die sandwich be separated easily. This can be accomplished by using a dicing saw, but such a process requires "tram lines" that waste wafer area, requires continuous straight line cuts, and causes chips and debris that need to be carefully removed from the finished devices. The silicon suspension plate wafer can easily be designed so that the individual die are easy to singulate as only small relatively weak tabs are left between the individual die after the DRIE process. This technique cannot be used on the insulators of the capacitive and backing plates which often as in the case of glass tend to suffer from conchoidal fractures as there are no distinct crystal planes for fractures to propagate. To overcome this problem we have developed a technique of creating perforated weak areas between the die that direct the cracks in the correct direction allowing the two insulating wafers to break cleanly along with the silicon suspension plate.

The backing wafer can be attached to the silicon proof mass wafer using a variety of techniques known to those skilled in the art, such as glass frit bonding, anodic bonding, eutectic solder bonding.

However the operation of the displacement transducer and the electrical interconnection of the seismometer require that the capacitive plate and suspension plate be separated by a well-controlled distance of the order of 40 microns for a normal seismometer with a sub nano-g resolution. The separation must also allow conductive paths to be formed between the two plates. The innovative solution for this is to use the re-melting and flowing together of precisely arrayed solder balls of very uniform diameter to form a closely dimensioned seal between the two wafers to be bonded. The flow path of the solder balls is controlled by a patterned wetting metal layer on each of the wafers to be bonded, a well-known technique. The invention here consists of controlling the disposition of the solder balls and their application to form a precisely dimensioned seal of well controlled thickness.

Solder sealing also can be utilized to vacuum-package the mechanical elements of the device. Without vacuum packaging the performance is limited by the damping of the motion of the mechanical elements by air: for a 20 mm×20 mmm square 0.5 mm thick silicon suspension plate with the hollow cavity filled with gas at atmospheric pressure results in a device with a "Q" of the order of several hundred, a mass of the order of 0.25 g and a resonant frequency of approximately 10 Hz, and that can provide sub nano-g resolution based on the "MTQ" product. For very quiet sites seismometers are required with resolutions down to the 10's of pico-g levels. The only parameter that can be changed significantly for a practical MEMS device is the "Q". We have demonstrated devices with a Q of 40,000 in vacuum. The ratio of this to our "Q" in air of 400 is 100, which accounting for the square root relation of MTQ product to acceleration noise would result in a theoretical resolution of better than $10^{-10}$ g's.

The solder sealing technique we have proposed or other techniques can be used to produce a vacuum seal and the use of gettering technology in MEMS devices to produce vacuum levels of milli-torrs or less is well documented in the literature and provided as for example by the commercial product "Nano-getters". A novel feature of the seismometer design is that as the capacitive plate is formed of glass optical power can be coupled into the device from a laser, this allows the activation of the getter with out resisitive heating elements, and without remelting the solder seal.

However, several other performance parameters are also required to improve to achieve these extremely high sensitivities. The displacement transducer noise floor needs to be improved and this can be done by decreasing the spacing between the suspension plate drive capacitors and the displacement transducer pick-up capacitors on the capacitive plate and decreasing the period of the displacement transducer arrays.

The completed seismometer dies needs to be mounted so they are maintained in the correct geometric orientation to each other and the reference surface of the instrument. The devices are packaged by the formation of the sandwich of three parts, which encases the proof mass and flexural elements within the package. However, it is important for the correct operation of the unit that the complete package is not subject to stress caused by thermal mismatch of the mounting, which is normally metallic, to the insulator silicon sandwich of the seismometer die. Using abrasive machining a novel mounting can be formed as part of the normal capacitive plate fabrication that ensures a sufficiently constrained, but not over-constrained mounting minimizing the transmission of thermal stresses to the seismometer die. The device mounts using three precision metal or ceramic balls. The first ball mounts in a machined hole, the second in a machined slot, and the final ball on the flat surface of the device. A resilient foam pad pushes the device down onto these mounting balls. This forms an ideal three-point mounting for the device as the first ball locates the device at a point in space, the second ball locates it on a defined line direction, while the third ball constrains it to a known plane in space.

The seismometer die requires electrical connections to the electronic pre-amplifiers mounted on the printed circuit board that introduce the minimum of capacitive strays and do not cause those strays to vary over time or temperature. The connections thus need to be as short as possible. Thus, wire bonded wires with their required service loop and tendency to move under shock or vibration are not ideal. The device uses a novel method of using an elastomeric connector preferably with embedded gold-plated wires as the connection path. By using the accurate DRIE and abrasive machining process the holder for this device can be made integral to the overall die as part of the standard fabrication process, reducing costs. The elastomeric connector also works in concert with the resilient foam retaining the seismometer die and does not cause additional stress on the die.

A further problem limiting reductions to the noise floor is the thermal, rather than, inertial response of the device. The silicon flexural elements are under a gravity bias of ~0.6 g in the Galperin configuration. Silicon has a temperature coefficient of elasticity of ~120 ppm/C. As the temperature increases the flexural elements weaken and the proof mass moves creating the same signal as an actual acceleration. In the most accurate mechanical seismometers this effect is compensated by using a spring with a close to zero temperature coefficient of elasticity as the flexural element. Although we cannot fabricate a compensated spring using current silicon technology we can isolate the flexural elements from the temperature variations so that the temperature induced error is outside the lowest frequency bandwidth of interest. This requires us to substantially attenuate the amplitude of the temperature variations down to periods of 20 seconds to be of the order of a few micro Kelvin.

We can much improve thermal isolation by reducing conduction from the device portion of the suspension plate to the external environment with the introduction of a micro machined sinuous thermal pathway which utilizes a minimum die area. This thermal frame is produced by through-wafer etching, preferably using DRIE, and can be formed at the same time as the proof mass and flexural elements of the seismometer.

The thermal frame construction and the vacuum packaging reduce greatly reduce the thermal conduction losses and eliminate convection losses. However, radiative losses can still be significant. These can be reduced by using low emissivity layers on the glass capacitive plate and backing plates to minimize radiative loss. These can be applied as metallic layers during the fabrication of these plates.

Further improvements can be made by using two sets of thermal frames and an internal glass cover set to provide a double radiative barrier, and a thermal reservoir within the device. Obviously this feature can be extended to as many internal covers as required in a "Russian Doll" concept.

These techniques are all passive. Active power dissipation in the electro-magnetic feedback coils can cause temperature fluctuations due to the resistive heating on the proof mass and on the flexural elements themselves. Using an additional feedback circuit and an AC signal outside of the band of interest the total power dissipation can be kept constant removing this particular error source. This constant power circuitry is a novel solution to this particular problem.

Finally the system can be modified further by measuring the temperature variations externally to the device the temperature of the inner frame can be actively controlled by using a control loop (preferably digital due to the extremely long periods required) and heat generating resistors on the frame to prevent the flexural elements seeing the external temperature variations. These packaging techniques and thermal control methodologies, both passive and active have general applicability to other MEMS sensors.

DETAILED DESCRIPTION OF THE PREFERRED EMBODIMENTS

As explained earlier, U.S. Pat. No. 6,776,042 entitled "MICRO-MACHINED ACCELEROMETER" discloses an improved micro-machined suspension plate which may be utilized in an accelerometer, seismometer (velocimeter) and/or other similar device. The subsequent U.S. patent application Ser. No. 10/851,029 entitled "IMPROVED MICRO-MACHINED SUSPENSION PLATE WITH INTEGRAL PROOF MASS FOR USE IN A SEISMOMETER OR OTHER DEVICE" discloses improvements to the basic design of the suspension plate.

Figure 1:
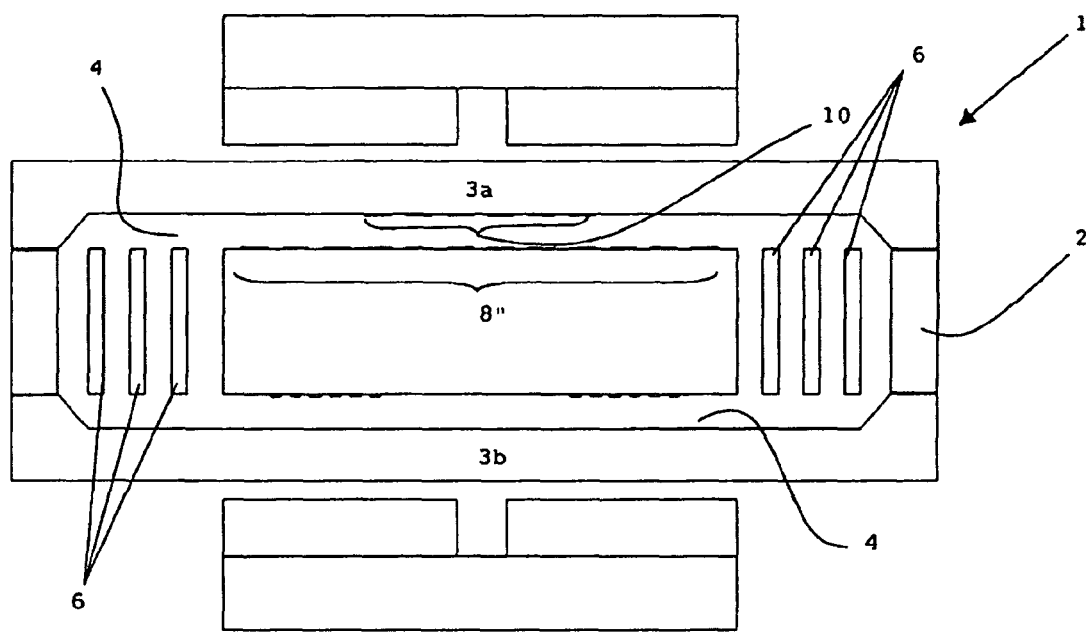
FIG. 1 illustrates a cross section of a seismometer die and magnetic circuit identifying the various elements of the device.

The suspension plate of the '029 application is formed of and includes a revolutionary, in-plane suspension geometry rather than a traditional—spring design. More particularly, the suspension plate is micro-machined to form a central proof mass and flexural elements located on opposite sides of the proof mass. FIG. 1 illustrates a cross-sectional diagram of a seismometer 1 having a suspension plate 2 and two capacitive plates 3a-b (alternatively, the device can have one capacitive plate), with a centrally located proof mass 8 supported by flexural elements 6 utilized in a known, prior-art micro-machined in-plane suspension geometry, as described and set forth in U.S. Pat. No. 6,776,042.

As shown in FIG. 1, the proof mass 8 is centrally located and surrounded by a hollow cavity 4. The flexural elements 6 extend from opposite directions and allow the proof mass 8 to move in one direction, in the plane of suspension, but suppress motion of the proof mass in all other directions. These flexural elements 6 represent a significant improvement over the conventional use of a mechanical cantilevered spring design for supporting the proof mass.

Figure 2:
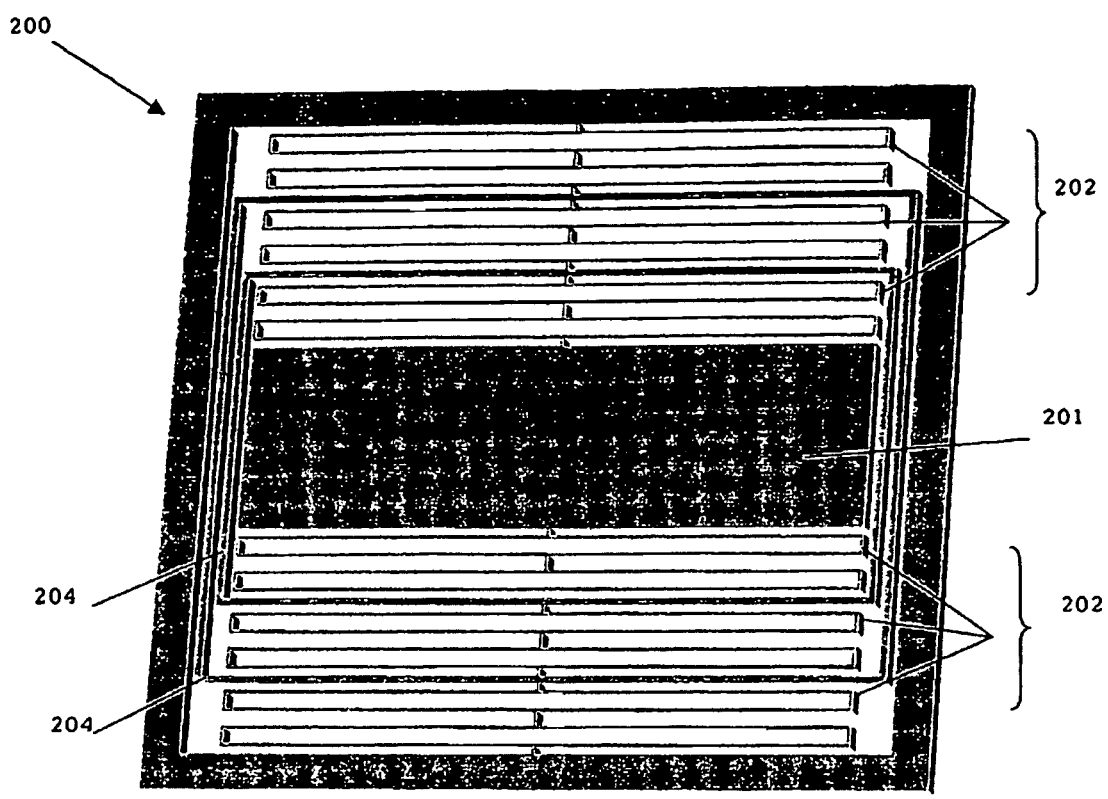
FIG. 2 shows the components of the suspension plate. It shows the flexural elements and intermediate frames.

FIG. 2 illustrates a suspension plate having a proof mass 201 supported by flexural elements 202 and further having intermediate frames 204 inter-disposed there between, in accordance with a first preferred embodiment of the present invention. Use of these intermediate frames 204 eliminates any spurious modes over a much larger bandwidth and allows the production of a device with a flat response over the region of such bandwidth. The intermediate frames 204 also provide additional support to the proof mass 201 and help reduce the out of plane sag. This improvement was disclosed in U.S. patent application Ser. No. 10/851,029

For practical production of a seismometer device having a suspension plate and two conductive or capacitive plates, as described in U.S. Pat. No. 6,776,042, it is highly desirable that a single device geometry can be used to produce all three components of the sensor—i.e. the capacitive plates and the suspension plate. In order to accomplish this, all three plates are preferably arranged in a "Galperin" orientation so each sees the same gravity vector. Due to the geometry of the device it is important to ensure for optimal operation and design that when exposed to this gravity vector the proof mass is centered. If the suspension plate it manufactured separate from the capacitive plates, then the gravity force on the proof mass will effect the centering of the proof mass relative to each of the other capacitive plates and this will affect the readings as to each plate when the whole device is formed.

Figure 3:
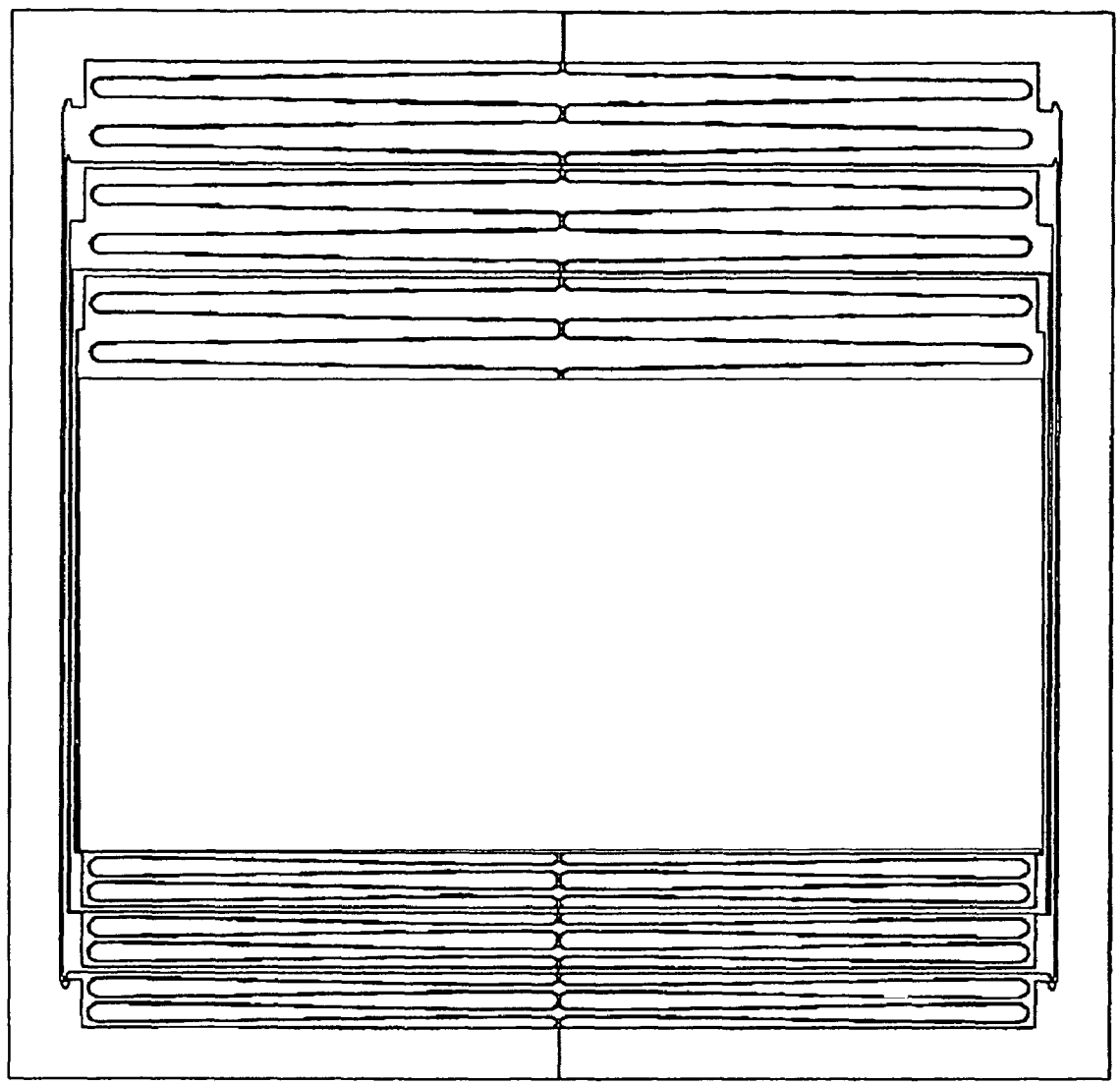
FIG. 3 shows a mask set that has been deliberately biased so that the flexural elements and intermediate frames are "pre-tensioned" when lying flat.

To ensure that the proof mass is centered after production, the mask set is deliberately biased so that the flexural elements are "pre-deflected" when lying flat. This pre-deflection is such that when orientated at the "Galperin" orientation or angle of 54.7 degrees, to the vertical the spring mass system is centered. When the material is removed by a method such as Deep Reactive Ion Etching (DRIE) the spring assumes a centered position at the Galperin angle of 54.7 degrees. The pre-deflection can be calculated either analytically or using Finite Element Analysis, both techniques are well know to those skilled in the art, such that the pattern is the same deflection pattern that would be observed in a released symmetrical structure when subject to an acceleration of opposite magnitude and direction to that the system when orientated at the Galperin position. This level of pre-deflection will then almost exactly counterbalance deflection due to the gravity vector in the Galperin orientation so that the mass will be nearly perfectly centered. FIG. 3 illustrates a mask set that has been deliberately biased so that the flexural elements are "pre-deflected" when lying flat.

Figure 4:
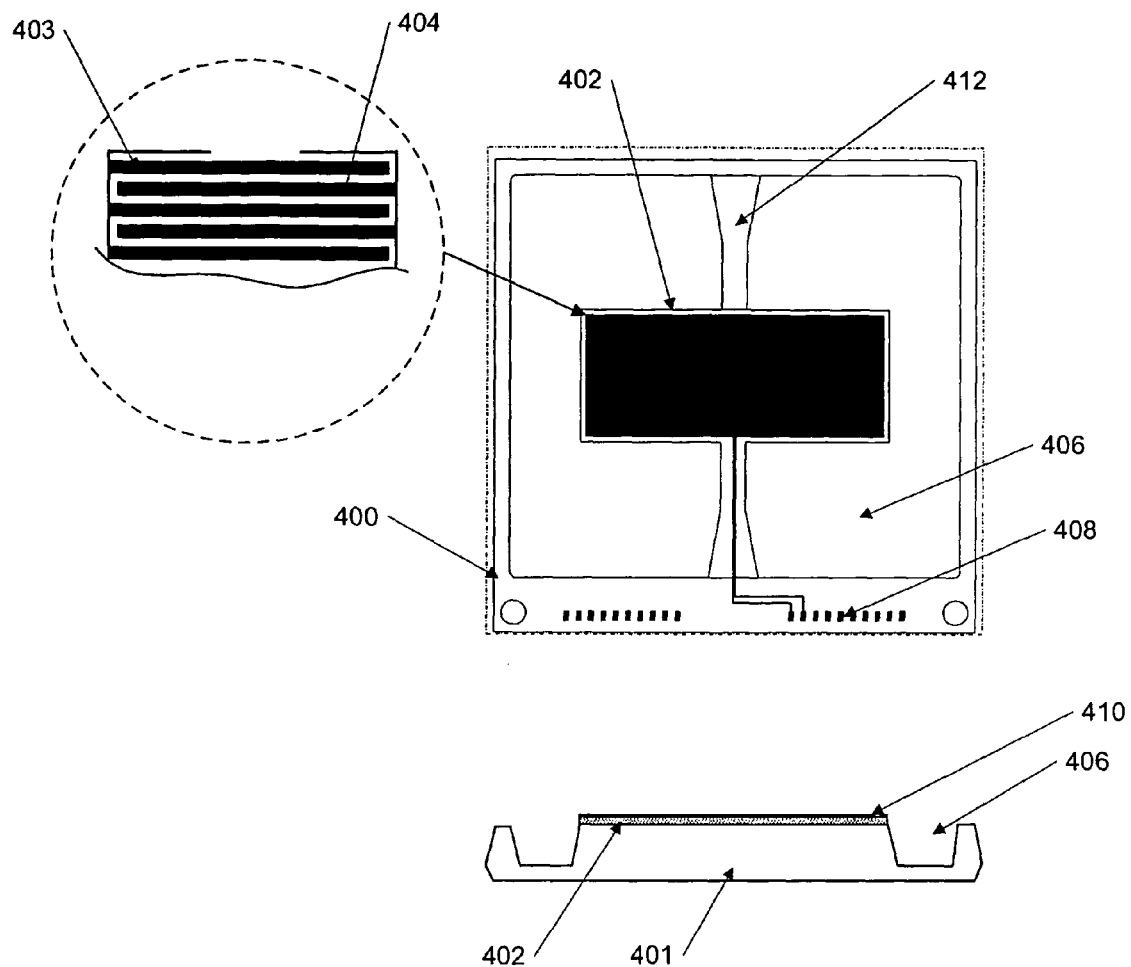
FIG. 4 shows the preferred embodiment of a capacitive plate fabricated by micro-abrasion.

FIG. 4 shows the design of a capacitive plate 400 using an insulator such as glass. The use of an insulator rather than a semiconductor for this plate ensures that the stray capacitance from the displacement transducer pick-up capacitor 402 is minimized as stray capacitance to the semi-conductor substrate is eliminated. A further improvement is realized by using a differential pick-up capacitor such that common mode pick up of extraneous signals can be rejected in the electronics. The two capacitors, shown as 403 and 404 in the enlargement, illustrate the geometrical design for such a pickup array. The capacitors driving this array are placed on the proof mass and are a similar pattern of inter-digitated fingers with the same repeat period as the capacitive pick up array. One problem of insulators such as glass is that they are subject to surface charge build up which can adversely affect the device. To prevent this very high resistivity film 410 such as indium tin oxide can be applied over the surface to prevent charge build up.

An important feature of the design is that whether two capacitive plates are used or one capacitive plate and a backing plate these plates should be of the same thickness to ensure that the overall seismometer dies does not bend due to thermal mismatch between the capacitive plate(s) and the silicon suspension plate.

The cross section 401 of the capacitive plate shows such a capacitive plate being formed by micro-abrasion from both sides of the plate using a protective mask. The metallization pattern is first applied to the plain wafer to form the displacement transducer pickup capacitor 402 the interconnection paths and the connection pads 408. The metal is then protected with the masking material. The first abrade then forms the controlled depth hollow 406 and the structure including the support beam 412 and the pedestal for the displacement transducer pickup capacitor 402. The depth can be controlled by careful control of the micro-abrasion parameters, particle size, gas pressure, nozzle diameter and distance from the work piece, and running for a constant time with the nozzles moving at a constant velocity across the part. The second abrade them forms trenches to allow the individual capacitive plates to be separated and the structures for the mechanical support of the seismometers. Through wafer tooling holes are also formed to allow mechanical alignment of all elements of the seismometer.

Figure 5:
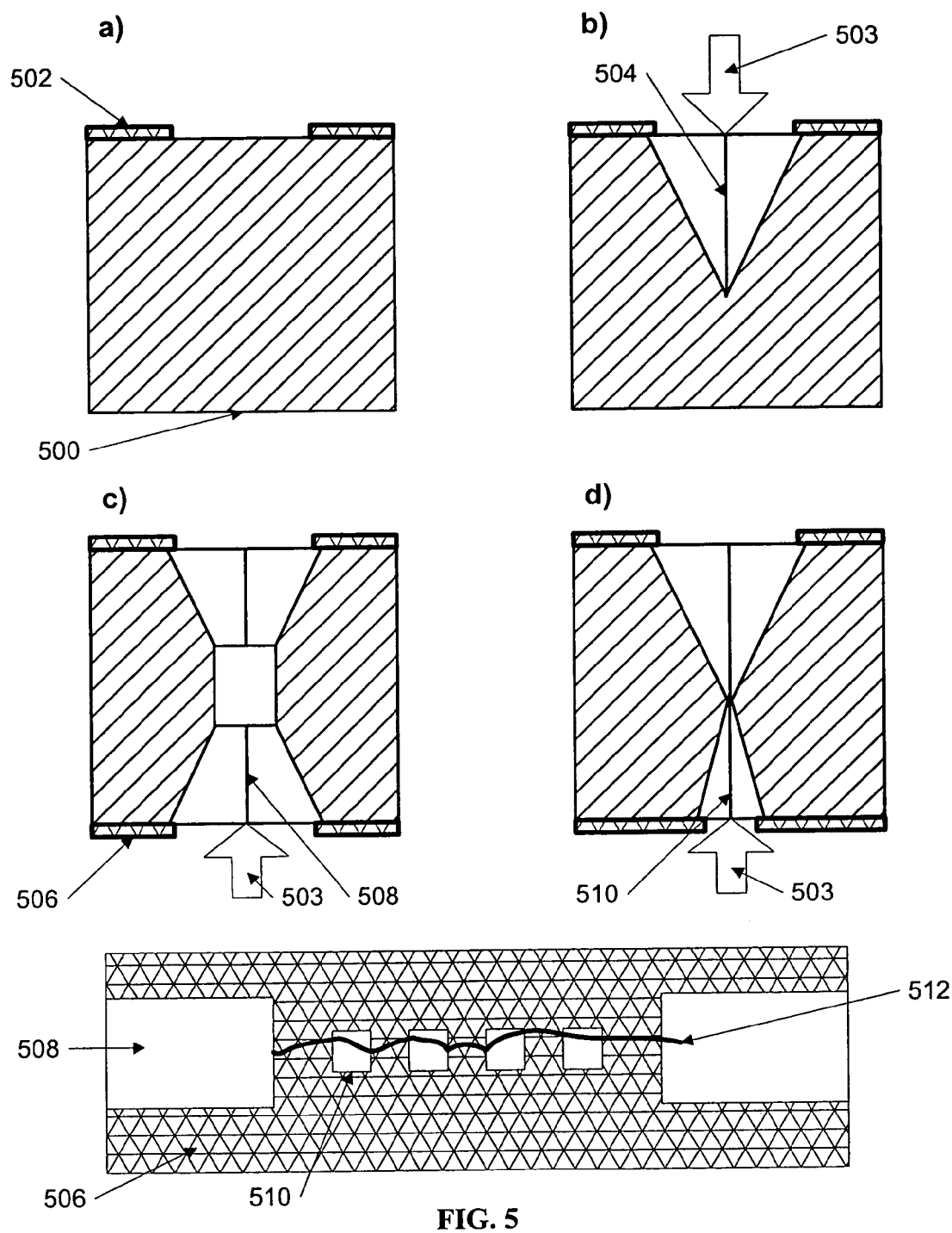
FIG. 5 shows the fabrication of a perforated support between capacitive plates using micro-abrasion.

To allow the seismometers to be assembled at the wafer level it is important that the capacitive plate, suspension plate and the backing plate remain as a contiguous wafer until they are bonded together. Separating these by a dicing saw is not a good process as explained earlier. In FIG. 5 we illustrate in cross section the process and mask required to form perforated support areas that will fracture in a controlled manner to allow the devices to be separated. In FIG. 5a the metalized capacitive plate wafer 500 has been masked with a suitable abrasion resistant cavity mask 502. The technique for forming such a mask is known to one skilled in the art of abrasive machining. In FIG. 5b the abrasive jet 503 has created a cavity trench on the top surface. In FIGS. 5c and 5d the bottom mask 506 also illustrated in the figure has been applied to the bottom surface and the abrasive jet 503 has been applied to the bottom surface. In FIG. 5c the abrasive jet has cut through the wafer completely to form a through trench 508, while in FIG. 5d the abrasive cut has created a pit shaped perforation 510. When the devices are singulated the fracture line 512 will be directed by the weak area of the pits to follow the desired path and not damage the device on either side.

The glass backing wafer can be attached to the silicon proof mass wafer using a variety of techniques known to those skilled in the art, such as glass frit bonding, anodic bonding, eutectic solder bonding.

Figure 6:
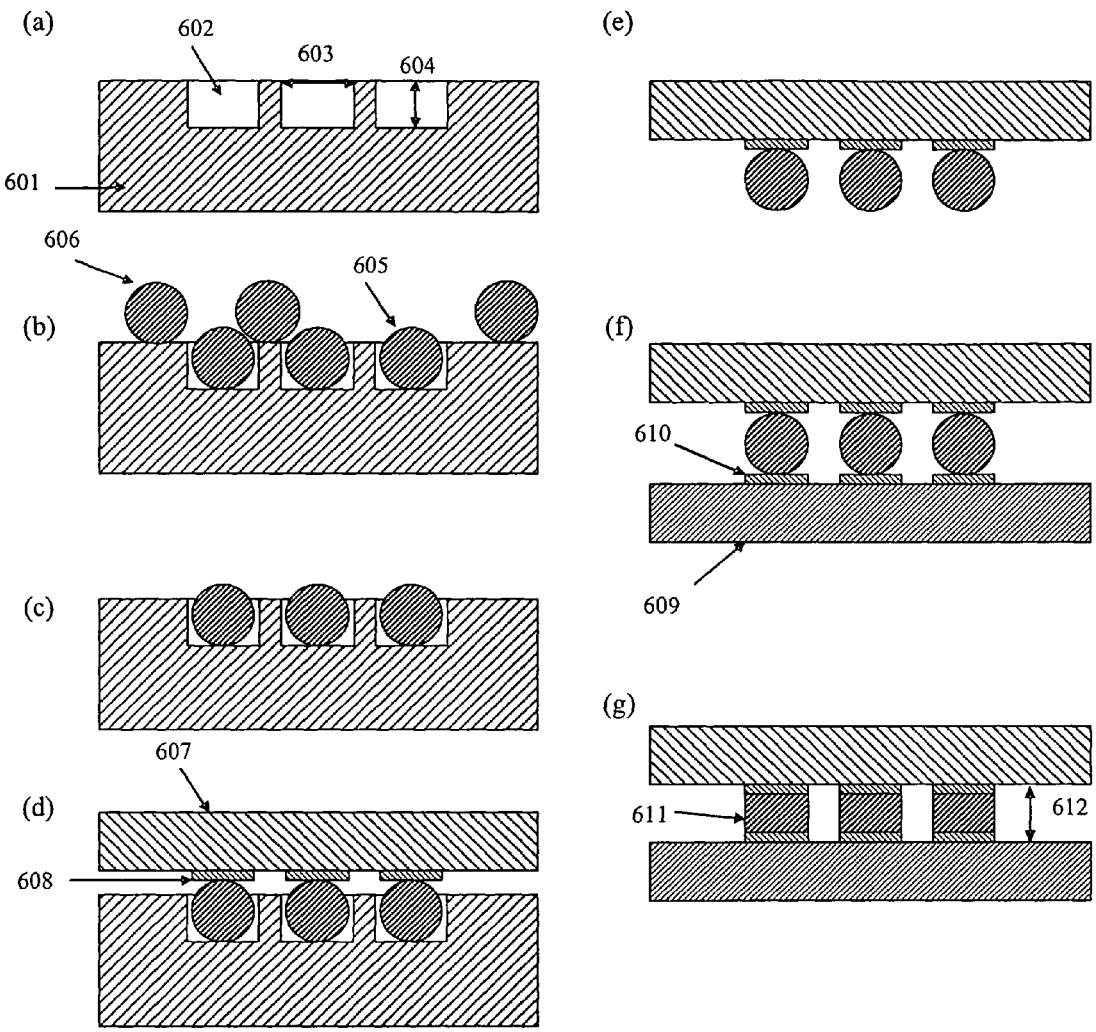
FIG. 6 shows the fabrication of a controlled solder seal using precision solder balls and a carrier wafer.
Figure 7:
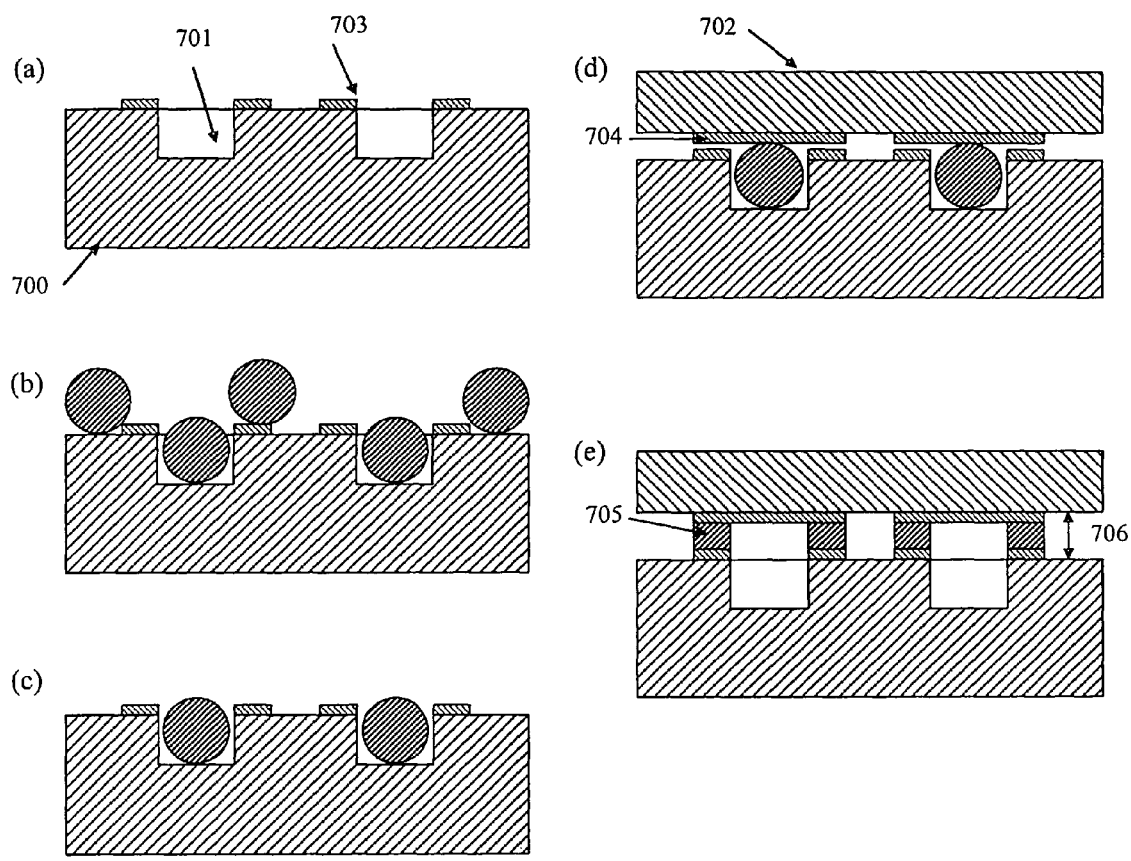
FIG. 7 shows the fabrication of a controlled solder seal using precision solder balls without the use of a carrier wafer.
Figure 8:
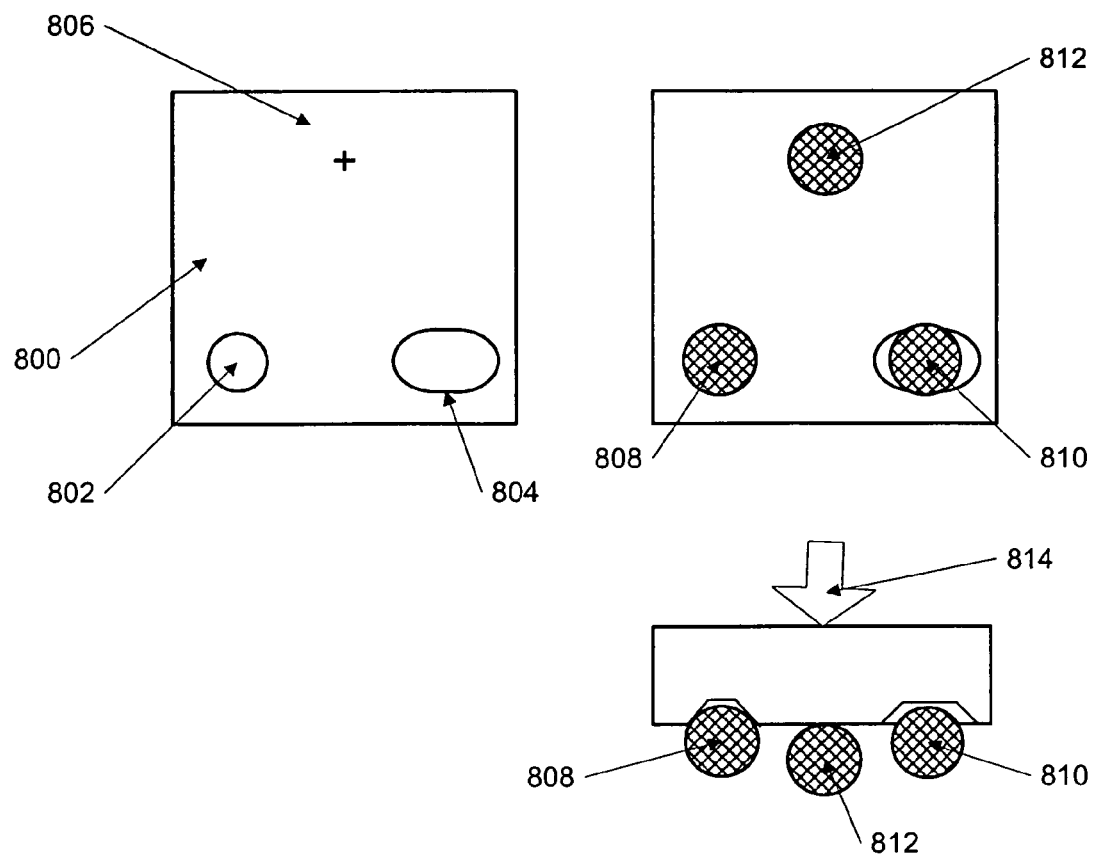
FIG. 8 shows the controlled orientation minimum stress mounting of the seismometer die using precision metallic or ceramic balls.

Solder balls can be aligned on one of the wafers to be bonded by depositing a volume of solder in molten form through a positionable microjet, using precise "pick and place" machinery, or by deposition via holes in a solder-ball frame. The solder balls in the latter two cases are immobilized on the wafer to be bonded by a partial re-melt before the second wafer to be bonded is aligned to the solder-ball carrying wafer, and full reflow performed. Our technique is an extension of the third, whereby the solder-ball carrier is formed by micromachining a silicon wafer, preferably by DRIE, with an array of circular holes in a mirror image of the final solder-ball locations on one of the wafers to be bonded. This wafer we call the solder-ball alignment wafer 601. In the alignment wafer, the diameter 603 of the solder ball holes 602 is a little larger than the solder balls 605, and the depth 604 of the holes a little less than the diameter of the solder balls. In one example, the hole dimensions for 100-micron-diameter solder balls was 105-microns diameter and 90-microns depth. As solder balls are available with tolerances of 2 microns in their diameter, lateral positioning can be performed to very nearly as tight a tolerance, as the hole diameter need only be slightly larger. An excess of solder balls 606 used to populate all the holes required for sealing either a die or a wafer is poured onto the micro machined solder-ball alignment wafer (FIG. 6b), which is then gently vibrated by hand to ensure all the holes are populated. The dimensions of the holes 602 ensures a single solder ball 605 occupies each one, and the excess solder balls 606 can be poured off by slightly tilting the carrier wafer and reused (FIG. 6c). To improve location and retention of the solder balls, which may be deflected by electrostatic forces, a further design modification to the solder ball wafer carrier is the inclusion of through wafer vertical channels from the un-recessed surface of the wafer to allow the application of a vacuum. The channels should be of a smaller diameter than the solder balls so that a reasonable seal is produced once the recess is occupied by a solder ball. The channels may be produced by DRIE from the lower surface of the wafer. The wafer to be bonded 607 is then offered face down to the alignment wafer for alignment between the solder balls and the patterned wetting layer 608. This inter-wafer alignment can be achieved either through visual manipulation, if the wafer to be bonded is transparent, through infrared (IR) imaging assisted manipulation, if the wafer is IR transparent, or by using alignment holes in both wafers with either precisely dimensioned rods or balls to mechanically lock the two wafers. After alignment the solder balls are immobilized on the wafer to be bonded either with a partial reflow onto the wetting metal layer, or by adhesion to a thin film of solder flux which has been previously deposited on the wafer to be bonded. After the solder balls are thus immobilized, the alignment wafer can be removed (FIG. 6e), a procedure which will not be impeded by any reflow as the solder will not adhere, but rather de-wet the silicon of the alignment wafer. If vacuum has been used to hold down the solder balls, it should be during this stage of the process. The second wafer to be bonded 609 with its wetting pattern 610 can then be aligned to the solder-ball carrying wafer to be bonded and the final bond achieved (FIG. 6f) through heating and reflow of the solder 611. The thickness control of the seal is achieved by knowing the exact volume of solder in the solder balls 605 and the exact pattern of the metallization on both wafers 608 610 by controlling these parameters the solder reflow 611 will result in a controlled separation 612 between the wafers.

When one of the wafers to be bonded has a flat surface, an extension of this technique can be performed without the need for an alignment wafer. The initially flat wafer to be bonded 700 is in this case patterned with the solder ball holes 701. Subsequent populating of the holes and alignment to the other wafer to be bonded 702 is as before, (FIGS. 2b-d) but a full reflow is then performed (FIG. 2e). The pattern of the wetting metal 703 around the alignment holes on the flat wafer to be bonded is such that reflow de-wets the solder balls from the solder ball holes and then re-wets the metallization on the second wafer 704 and then the metallization on the first wafer 703, forming the reflowed solder bond 705 between the two wafers with controlled separation 706.

To ensure a precise alignment of the seismometer die to the mounting a three point mounting technique is used that precisely constrains but does not over constrain the seismometer die. This technique has general applicability to MEMS devices that need to be accurately mounted with minimal thermal stress. The capacitive plate 800 has a precision diameter hole abraded into it 802, and a slot with the same minor diameter 804, and a smooth un-machined surface 806 is available. To mount the device it is located at a point in space by a precision metallic or ceramic ball 808 located in the hole 802, a second ball 810 aligns the die along a line between the hole 802 and the slot 804. Finally the third ball 812 defines a point in space on the die 806 fixing its location in space. The force 814 from a resilient pad then presses on the die keeping it located onto the three point support provided by the balls.

Figure 9:
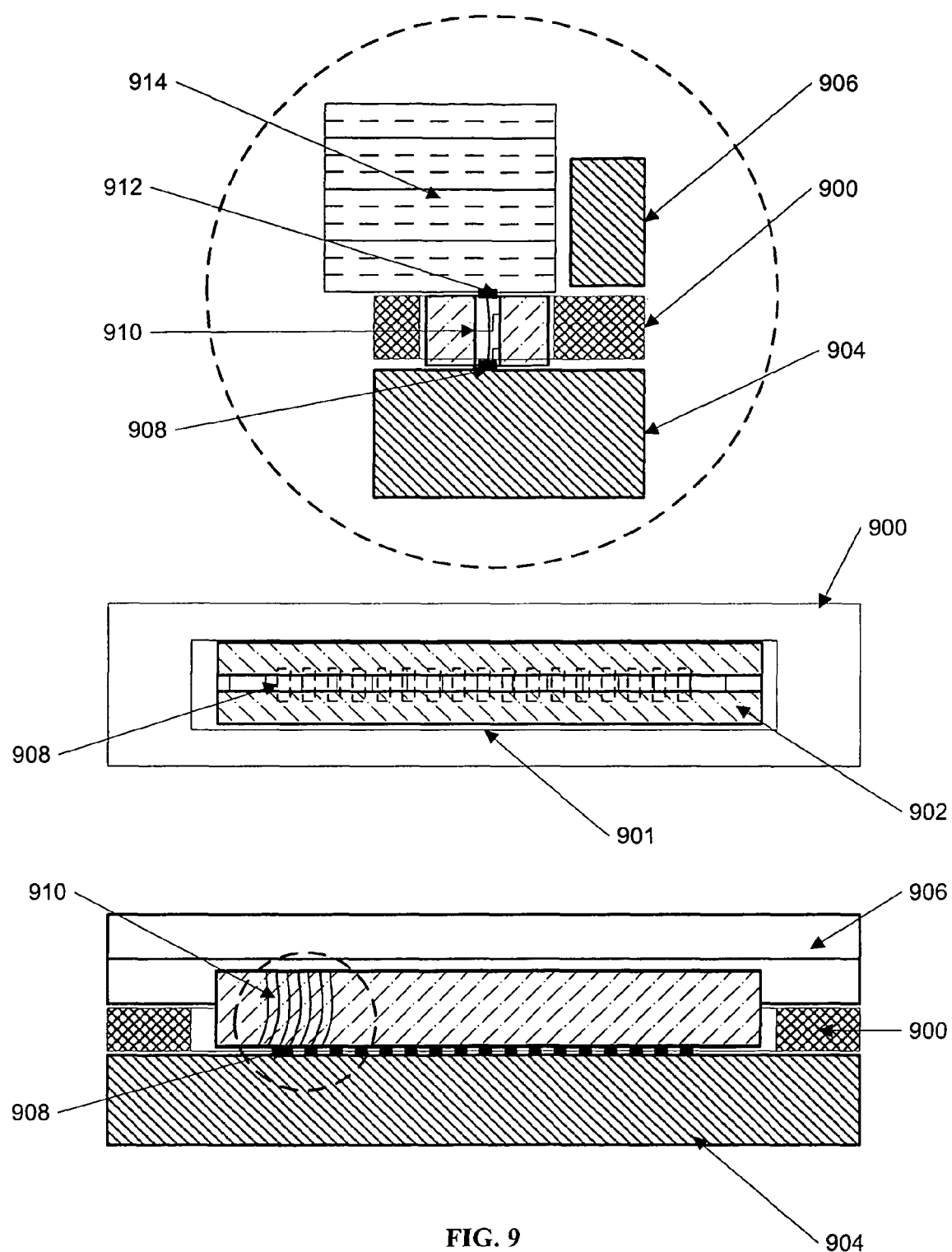
FIG. 9 shows the use of an elastomeric connector to connect the seismometer dies to the traces on a printed wiring board.

The use of an elastomeric connector that preferably uses embedded gold plated wires allows for minimum capacitance, minimum stress electrical connections between the seismometer die and the electronics. In FIG. 9 the suspension plate 900 has a slot etched 901 etched through it during the DRIE process needed to form the other structures. The dimensions of this slot 902 are designed such that it ensures the correct degree of compression on the elastomeric connector 902 as this is sandwiched between the seismometer die and the printed circuit board 914. The elastomeric connector 902 makes contact with the electrical connection pads 908 on the capacitive plate 904 using the e embedded gold plated wired 910. These wires 910 then make electrical connection to the printed circuit board traces 912 on the printed circuit board 914. The backing plate 906 is machined to clear the printed circuit board. The design of the elastomeric connector 902, contacts 908, and traces 912 is such that the pitch of the gold wires 910 is designed that no pads 908 can be connected to the wrong trace 912 by the wires 910.

Figure 10:
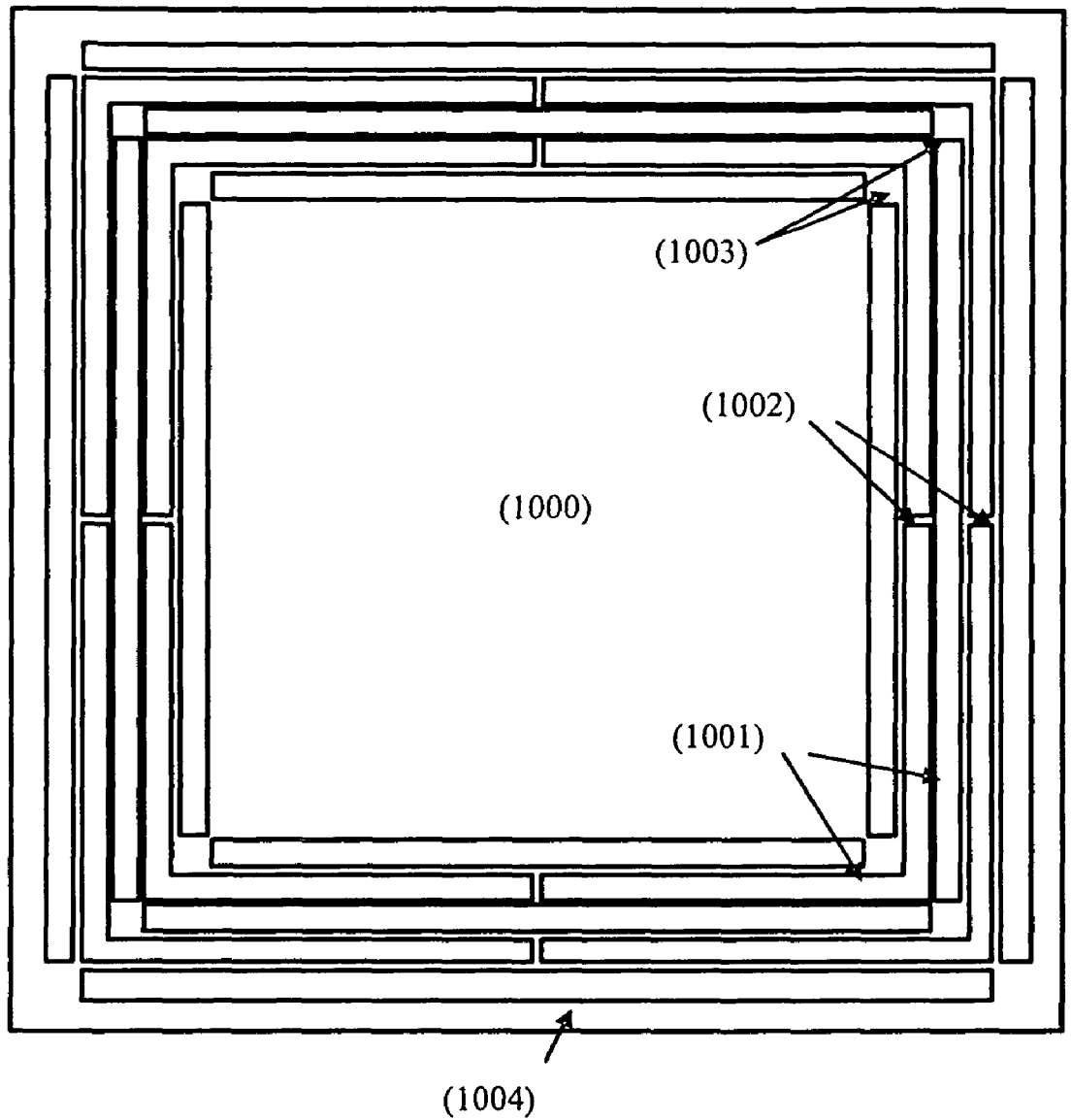
FIG. 10 shows the design of the thermal isolation structure.

The preferred design for thermal isolation by through-wafer etching is illustrated in the plan view of a micromachined die in FIG. 10. The central portion of the die 1000 can be used to fabricate any sensor structure which would benefit from thermal isolation. The conductive thermal coupling is reduced by etching out much of the die towards the edge to leave a series of thin beams 1001 and interconnections at the midpoints 1002 and corners 1003. In incorporating a thermal frame into an inertial sensor, it is important not to compromise the dynamics of the coupling between the sensor on the central portion of the die and the environment. Hence the design has to ensure maximum rigidity at the same time as producing the longest thermal path from the frame to the central die. For a vertical downwards acceleration, the central die is supported by the sets of beams on the left and right hand side, within which there will be compressive and extensive strains. The central interconnections 1002 have no overall stress at these, the weakest, points. The upper and lower sets of beams take very little of the load—and would not be very rigid if they did as they would undergo cantilever deflection. Without the left and right beam sets the thermal frame produces a non-rigid suspension geometry. The external frame 1004 forms the connection to the external packaging of the die.

The structure will be very rigid below Euler's critical loading of the compressed beams with no bending of the beams. Above that loading the side beams will deflect as cantilevers until the beams touch, at which point the structure will become rigid again. From the formula for the critical loading, $F_{crit}$, $$F_{crit} = \frac{\pi^2 EI}{L^2}$$

where E is Young's modulus, I is the second moment of the beam, which for a rectangular cross-sectional beam as produced by DRIE is $W^3 t/12$, where w is the width of the beam, t is the thickness of the wafer, and L is the length of the beam, approximately half the die size. The acceleration to reach critical loading can then be calculated to be $$a_{crit} = \frac{\pi^2 E w^3}{24 \rho L^4}$$

where $\rho$ is the density of silicon. For a 2 cm die and 40-micron beams, $a_{crit}$ is about 5 g. Below 5 g, the resonant frequency of this structure is approximately 5 kHz. The dynamics of the structure could be exploited for shock protection.

The thermal behavior can be simply modeled. The structure above has two periods of thermal isolation structure. For each period there are eight equivalent thermal paths of length 2L. The thermal conductance is therefore given by:

$$Y = \frac{8\kappa wt}{2LN}$$

where $\kappa$ is the thermal conductivity of silicon, and N is the number of periods of thermal isolation structure. The structure implemented by DRIE would in fact have parallel beams, approximately spaced by w, and so if a border width on each side of the die, x, is given to thermal isolation, N=x/4w, and so $$Y = \frac{16 \kappa w^2 t}{Lx}$$

The thermal capacity of the central die, treating it as an un-machined block of silicon, is given by $$C = 4L^2 t \rho G$$

where G is the heat capacitance of silicon. The thermal time constant now becomes $$t = C/Y$$

$$= \frac{L^3 \rho G x}{8 \kappa w^2}$$

For a 2-cm die, a 1-mm margin and 40-micron beams t is 30 minutes. The conductance is 0.05 mW/K. If 2 mm is set aside and 20-micron beams and spacing are achievable, a four-hour time constant is obtained and the conductance is reduced to 0.006 mW/K and only 0.5 milli Watts would be required to hot bias the sensing element by 80 degrees Celsius.

In addition, the suspension itself further reduces the thermal conductance by a small amount. For 30-micron springs, with effectively half the thermal pathways and four thermal periods per spring set (eight cantilevers), they have an additional 100-s period per spring set.

All the above considers just conductive losses. Effective radiative conductance will be given from Stefan's law as approximately $$Y_{rad} = 4\epsilon \sigma L^2 T^3$$

where $\epsilon$ is the emissivity of the die, s is Stefan's constant and T is the temperature. This gives the ratio of radiative to conductive losses as:

$$\frac{Y_{rad}}{Y_{cond}} = \frac{\epsilon \sigma}{\kappa} \frac{L^3 T^3}{w^2 t}$$

For $\epsilon$ of 0.01, for a 2-cm die with 1-mm thermal margin and 40-micron beams, $Y_{rad}/Y_{cond}$ is 26%. Radiative losses will be about the same as conductive losses for the second case, indicating that a thermal time constant of about two hours is probably the best achievable without mitigation of radiation losses.

Figure 11A:
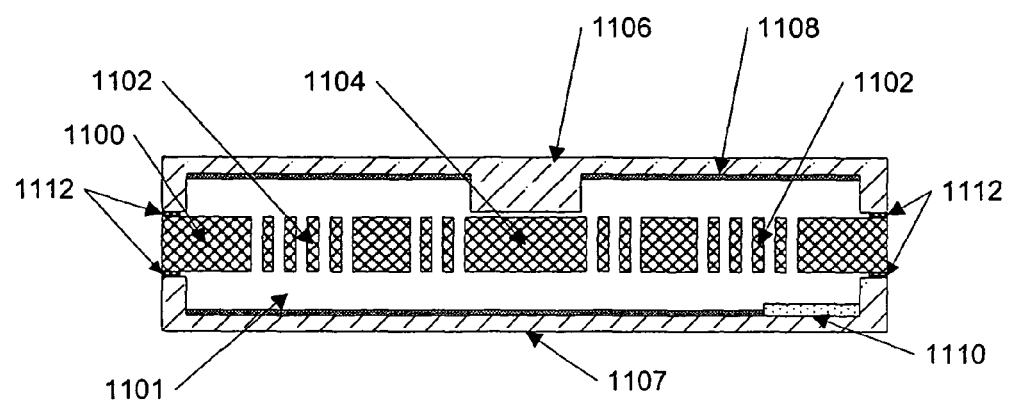
FIG. 11 shows the design of the radiative shields and multiple enclosures.

To complete the packaging of the device and preserve the thermal isolation a vacuum must be maintained in the hollow cavity 1101 around the suspension plate 1100 as shown in FIG. 11a. The suspension plate 1100 has the thermal isolating structure 1102 etched into it and then the flexural elements and proof mass 1104. Using an abraded capacitive plate 1106 and a backing plate 1107 sealed to the suspension plate 1100 by seals 1112 under vacuum conditions a vacuum cavity 1101 is created. As part of this fabrication a gettering material such as the commercially available "NanoGetter" film 1110 should be applied to either the capacitive plate 1106 or the backing wafer 1107. If solder-ball sealing is utilized the temperature is not sufficient to activate the standard commercial getters. Rather than use electrical resistive heating with its requirement for additional electrical connections if the insulating plates are glass a laser can be shone through the material to local heat and activate the getter without reflowing the solder seal. The outer cavities have thin layers of smooth reflective metal such as gold or aluminum deposited in unused areas as a radiative shield 1108. The exterior of the die can also be coated with a radiation shield layer if desired.

Figure 11B:
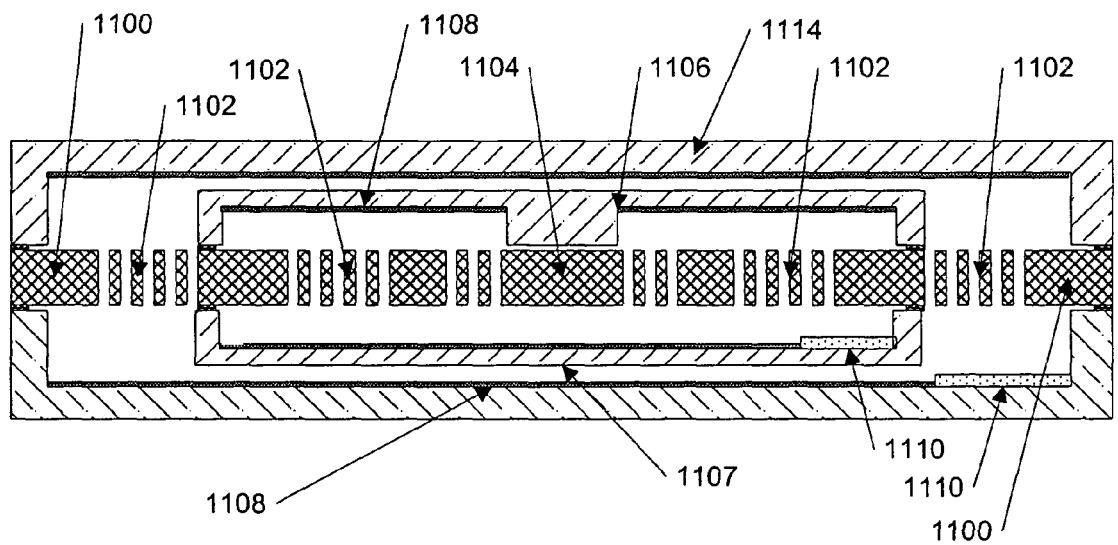

In FIG. 11*b* a design is shown in which there are two distinct cavities formed as described above. The inner cavity will act as a thermal reservoir for the contained sensing element 1104, while the additional outer packaging 1114 presents an additional radiative barrier using a smooth metal deposition 1108, gettering material 1110 is present in both cavities. Obviously this concept could be extended to additional cavities if required for the application. This packaging concept can be used for any sensor that requires isolation from short term temperature variations in the environment.

Figure 12A:
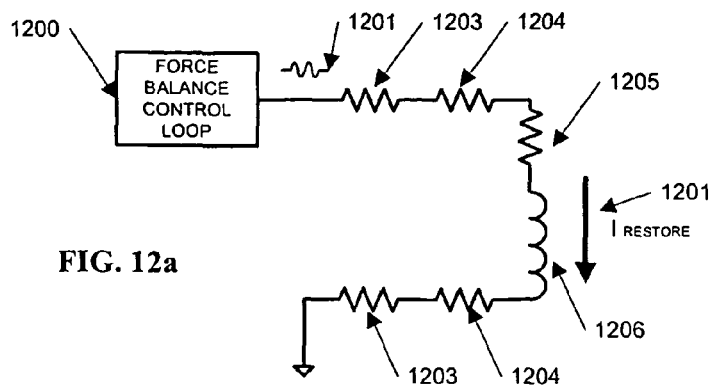
FIG. 12 shows a block diagram of the proposed active control systems for reducing the effect of coil heat dissipation and actively controlling the inner enclosure or frame.

During the operation of a force balance control loop using an electro-magnetic actuator a current is required to flow in the coil to create the required restoring force. The process is illustrated in FIG. 12*a*. Here the force balance control loop 1200 outputs a restoring current 1201 that flows through the coil 1206 that creates a force due to the current's interaction with the magnetic field present in the actuator. In the seismometer there are resistive elements present in the circuit. The resistance of the thermal isolation path is represented by resistors 1203, the resistance of the flexural elements by resistors 1204 and finally the resistance of the coil itself on the proof mass by the resistor 1205. The current passing through these resistors causes a voltage drop and heat to be dissipated in the resistors. Providing the voltage drop does not cause the current source in the control loop to fall out of compliance this will not affect the performance of the force balance loop. However, the heating can cause a non-linearity in the system response as the restoring current causes heating and changes in the spring rate of the flexural elements.

Figure 12B:
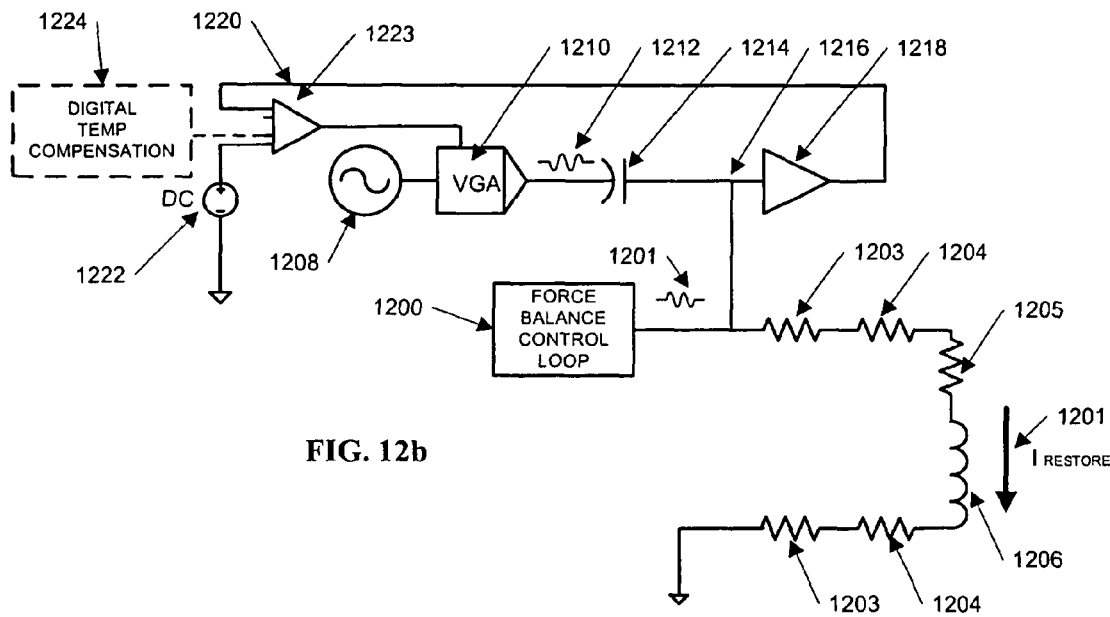

A technique to minimize this effect is shown in FIG. 12*b*. In this figure an oscillator has been added to the circuit that produces a frequency considerably above the seismic band of interest and such that the force produced is filtered out by the mechanics of the system. This signal is then passed through a voltage controlled oscillator 1210 resulting in an amplitude modulated signal 1212, this is injected via capacitor 1214 into the coil circuit. The voltage of the coil drive 1216 including the resistors is input to the buffer and RMS level detector and low passed filtered 1218. This voltage 1220 is then compared to a DC value 1222 that sets the operating point for power dissipation in the resistors. The output of the amplifier 1223 is then used to control the variable gain amplifier 1210. With the feedback loop properly compensated the circuit will vary the ac signal inversely to the seismic signal such that the RMS power dissipation is maintained constant within the operating range of the loop. The implementation described is just one of many possible implementations of such a control loop. The novel feature is the use of a high frequency amplitude modulated AC carrier to maintain constant heating in the resistors as the low frequency seismic signal varies.

Figure 12C:
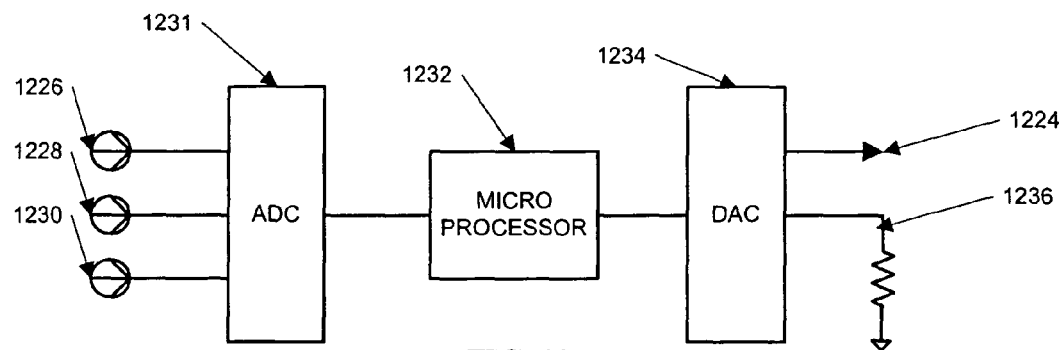

An additional input is shown as digital temperature compensation 1224, one possible implementation of this is shown in FIG. 12*c*. Generally a digital system will be preferred for this system due to the very long time constants required in the control loop. The system is illustrated with inputs from three temperature sensors, sensor 1226 monitors the external temperature, sensor 1228 monitors the temperature of the frame after the thermal isolator, while sensor 1230 monitors the temperature of the proof mass. The temperature reading is converted to a digital stream via the ADC 1231 and read by the microprocessor 1232. The firmware within the microprocessor can be written using several control strategies known to those skilled in the art to produce one or more outputs that can be converted to an analog voltage by the DAC 1234. The voltages can be fed into the control loop of FIG. 12*b* 1224 or they can be used to dissipate power in a resistor 1236 that would be situated on the frame after the thermal isolator. The number of sensors and heater locations could be increased in this scheme to further reduce the temperature variation seen on the springs.

Figure 13:
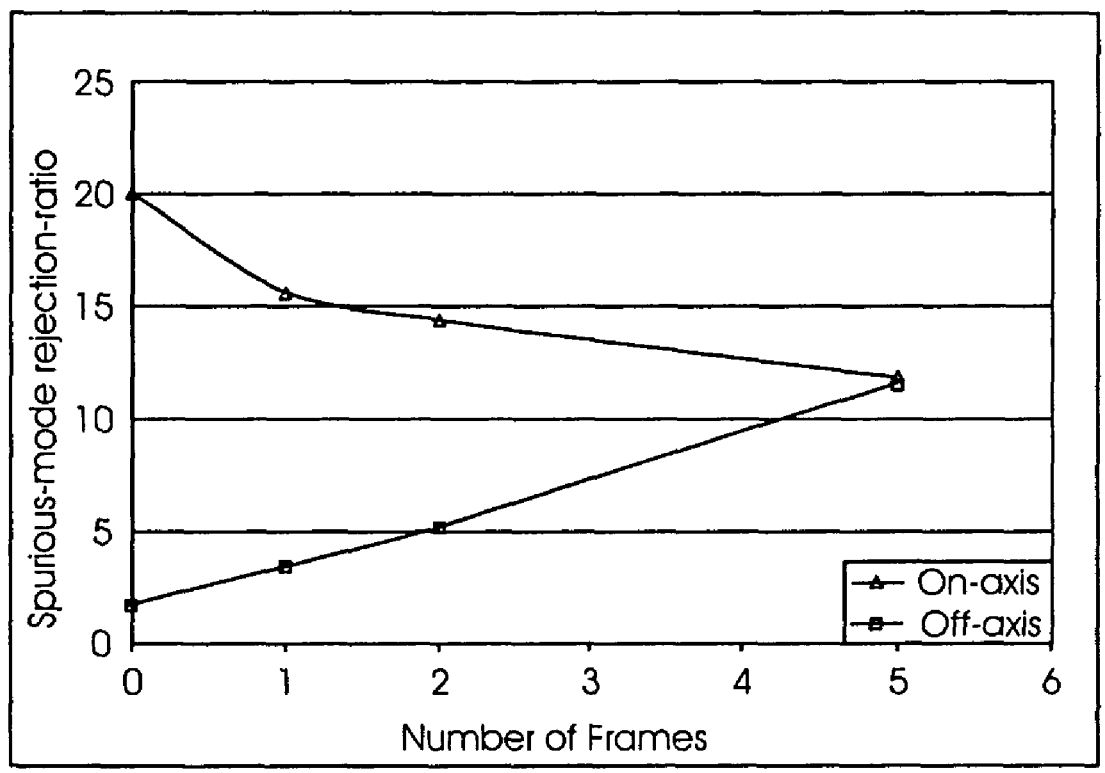
FIG. 13 illustrates the spurious mode rejection ratio for in-axis and out-of-axis modes as the number of intermediate frames is increased in a preferred embodiment having six flexural elements on each side of the proof mass.

FIG. 13 illustrates the spurious mode rejection ratio for in-axis and out of axis frequencies as the number of intermediate frames is increased. We can see from FIG. 13 that in order to maximize the rejection ratio for both in-axis and out of axis frequencies, the number of frames that should be incorporated into the design is five, one between each of the six flexural elements. As the rejection ratio rises more steeply for the off-axis case than it falls for the on-axis case, there will be an overall tendency for more frames to produce better performance.

Figure 14:
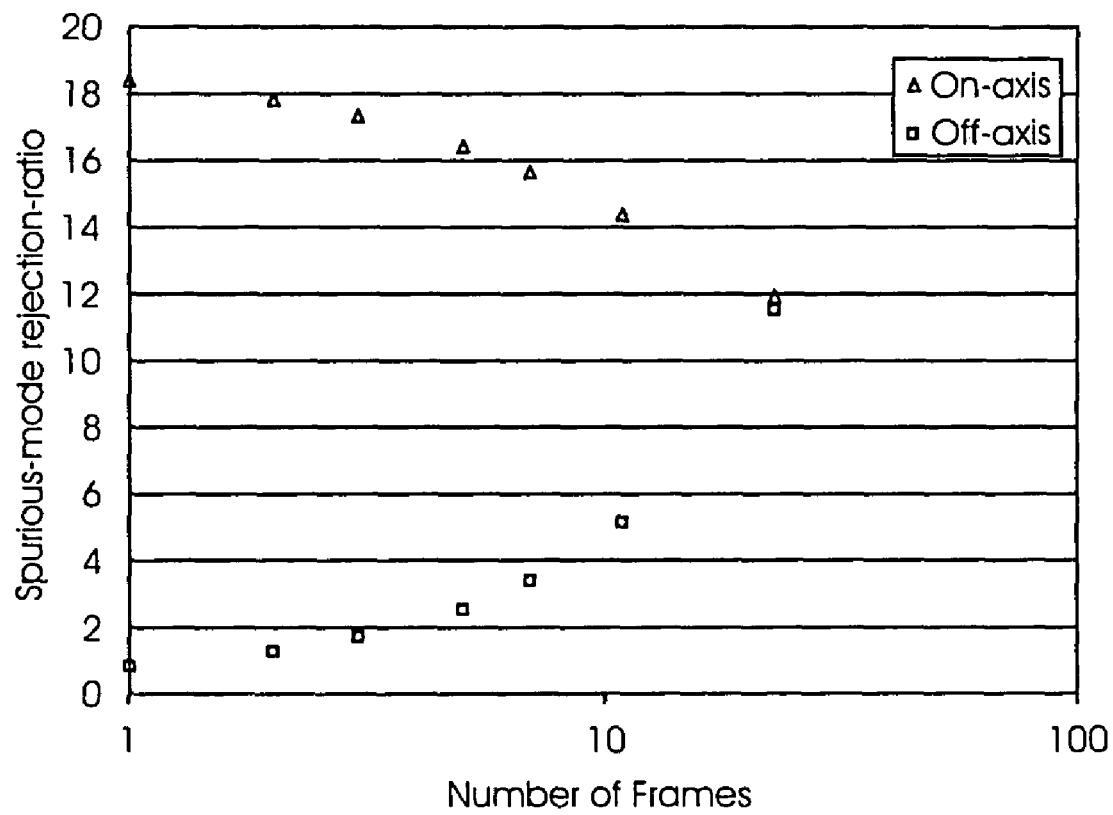
FIG. 14 illustrates the spurious mode rejection ratio for in-axis and out-of-axis modes as the number of intermediate frames is increased in a preferred embodiment having twenty-four flexural elements on each side of the proof mass.

If we take an example with more flexural elements we can calculate more data points and see again the convergence of the "on-axis" and "off-axis" modes to give an improved overall rejection ratio. For example, in one preferred embodiment let us assume we have twenty-four flexural elements in order to achieve a desired frequency response. For this case, let us again plot the in-axis and out-of-axis frequencies in relation to the fundamental frequency, the so called "spurious-mode rejection ratio". FIG. 14 illustrates the spurious mode rejection ratio for in-axis and out of axis frequencies as the number of intermediate frames is increased. We can see from FIG. 14 that in order to maximize the rejection ratio the maximum number of frames utilized in the design should be approximately twenty-three, one between each intermediate frame should be incorporated into the design.

It is important to note that in some designs it may be desirable for other system considerations to not optimize for an equivalent spurious mode both for the in-axis and off-axis, but to allow say a lower off-axis spurious mode compared with the in-axis mode. This could be used for example when the off-axis is suppressed by the Displacement Transducer geometry, while the in-axis mode is not. The techniques presented can be used for any desired optimization.

Figure 15:
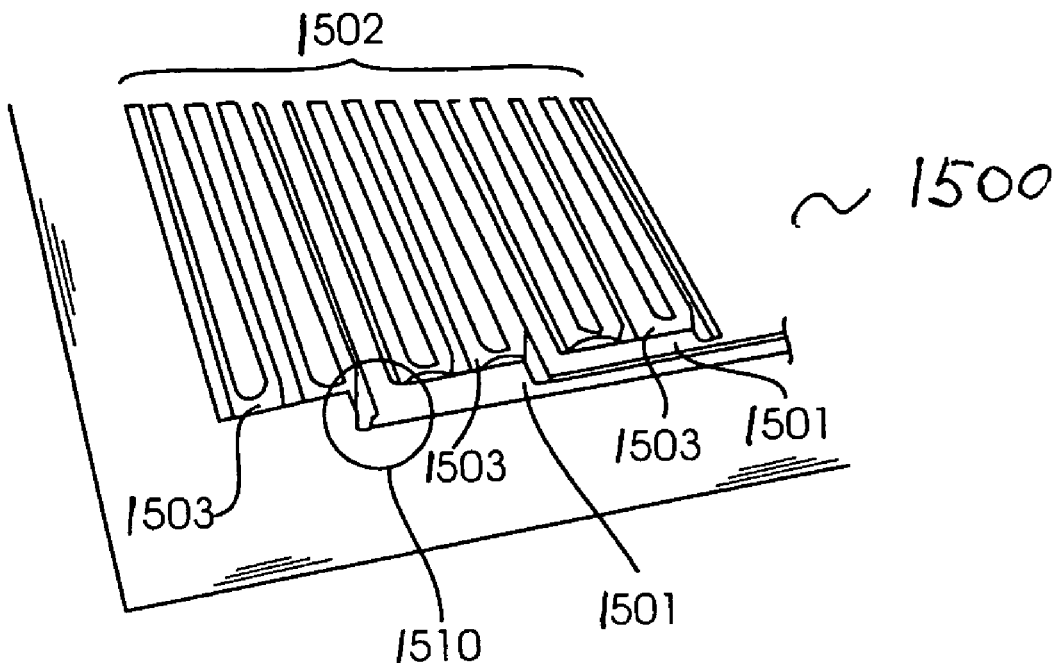
FIG. 15 illustrates a perspective view of a suspension plate having a spring/gas dampening structure in accordance with a preferred embodiment of the present invention.

The invention also preferably includes a dampening structure that is highly effective during non-powered/non-operational states (i.e. when the feedback control system is not powered and does not provide any dampening). Preferably, this dampening structure includes a spring/gas dampening structure configured to provide damping during non-powered states. FIG. 15 illustrates a perspective view of a suspension plate 1500 having a spring/gas dampening structure 1510 in accordance with a preferred embodiment of the present invention.

As shown in FIG. 15, each of the intermediate frames 1501 is preferably larger (longer) in length then the flexural elements 1503 disposed between each of the frames, with each frame traversing a larger portion of the internal cavity 1502. The intermediate frames are also sufficiently rigid, but as light as possible, in order to suppress out of plane movement of the proof mass while also suppressing spurious resonant frequencies without breaking or fracturing. The intermediate frames 1501 are designed to physically contact with each other before the flexural elements 1503 interspersed between them are compressed sufficiently to cause damage to the flexural elements 1503.

In order to prevent fracturing and/or damage due to extreme external shock or vibration, the invention preferably further includes the specially formed spring/gas dampening structure 1510, which provides additional damping to the system during non-powered states.

Figure 16:
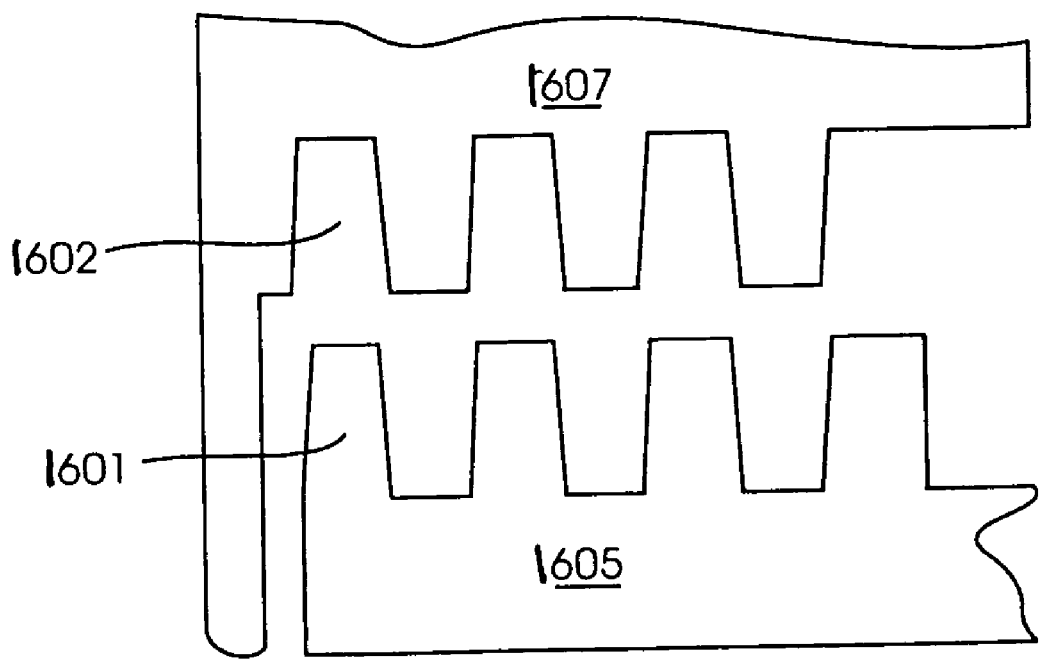
FIG. 16 illustrates a close-up view of a preferred embodiment of the spring/gas dampening structure.

Turning to FIG. 16, there is shown a close-up view of a preferred embodiment of the spring/gas dampening structure 1510. As shown, the preferred embodiment preferably includes one or more trapezoidal shaped pistons 1601 and engagement apertures 1602. In a preferred embodiment, a piston 1601 is preferably positioned on the last (most outward) intermediate frame 1605, facing outward, and the corresponding engagement aperture 1602 is then positioned on the inner surface of outer frame of the suspension plate 1607, facing inward. As the most outward intermediate frame 1605 approaches the inner surface of the outer frame of the suspension plate 1607, the piston 1601 will engage and insert into the aperture 1602, thereby providing a dampening effect before the intermediate frame can contact the surface of the outer frame of the suspension plate.

In a preferred embodiment, the cavity of the suspension plate is preferably filled with a non-conductive gas such as air or nitrogen. As the outermost intermediate frame 1605 moves toward the inner surface of the outer frame of the suspension plate 1607, the piston 1601 engages with and inserts into the engagement aperture 1602. As the piston recedes further into the aperture, the gas within the engagement aperture increases in pressure, causing a force to be exerted against the piston and slowing the motion of the intermediate frame until, possibly over multiple oscillations of the spring mass system, it comes to rest, thereby preventing damage to the flexural elements.

Figure 17:
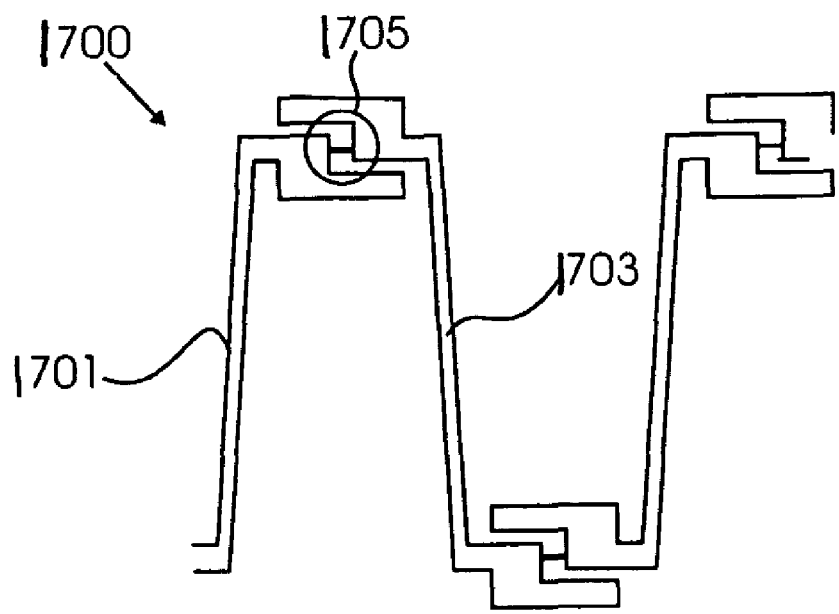
FIG. 17 illustrates a close-up view of a piston used in an alternative embodiment of the spring/gas damping structure.
Figure 18:
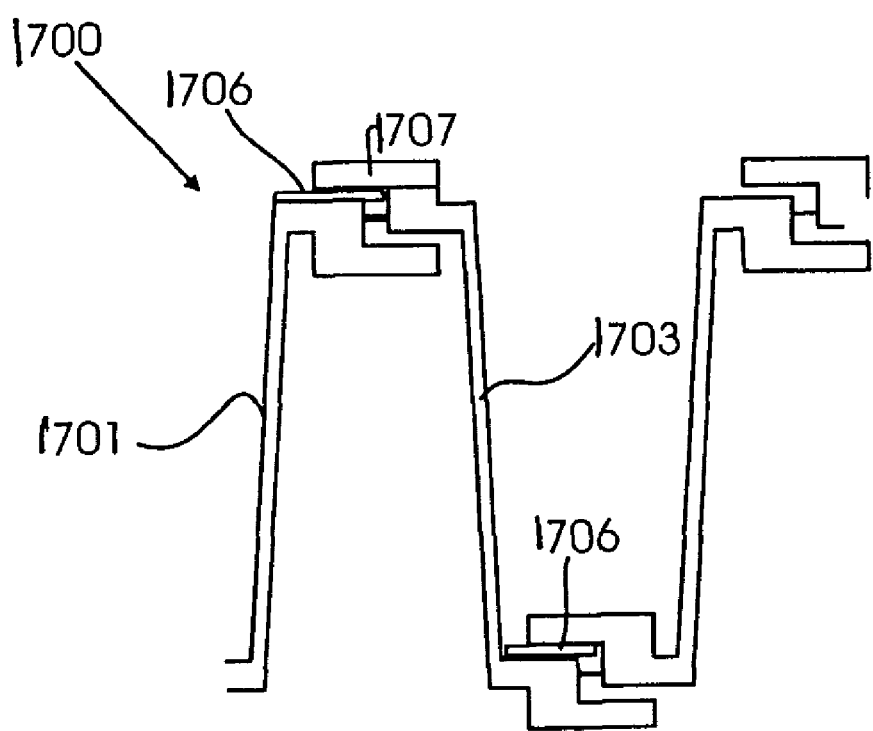
FIG. 18 illustrates another close-up view of an alternative piston used in an alternative embodiment of the spring/gas damping structure.

Alternatively, the cavity within the suspension plate may be evacuated. In this case, the spring/gas dampening structure is preferably comprised of an aperture and a corresponding piston wherein the piston is actually formed of two separate portions coupled together using a small resistance spring. FIG. 17 is a close-up view of such an alternative embodiment of a piston 1700 used in a spring/gas damping structure, wherein the piston is formed of two separate portions coupled together using a small resistance spring. As shown, the piston includes a first half-portion 1701 and a second half-portion 1703, which are coupled together using small resistance springs 1705. In normal operation when the pistons are not engaged these two spring elements are separate, but as the parts contact they form a spring element. As the piston 1700 inserts further into the aperture of the spring/gas dampening structure, second half portion 1703 of the piston is pushed against and closer to the first half portion 1701 while the resistance spring provides a force against the second half portion 1703. As the second half portion 1703 moves closer to the first half portion 1701, the resistance from the spring increases. This spring motion can be used both to dissipate energy, but also to act as an energy store to disengage the first and second half portions to prevent them "sticking" together by the force of stiction and preventing the device from functioning as a spring mass system. Alternatively, as shown in FIG. 18, a layer of damping material such as a visco-elastic polymer 1706 may be inserted between the first half portion 1701 and the second half portion 1703, in place of or in addition to the resistance spring. A visco-elastic material block 1707 can also be deposited on top of the spring element 1705 to provide damping and energy loss in the spring While the description above refers to particular embodiments of the present invention, it will be understood that many modifications may be made without departing from the spirit thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced herein.

What is claimed is:

1. A seismometer comprising:
at least one fixed capacitive plate;
a first capacitive sensor array positioned on a surface of said fixed capacitive plate, said first capacitive sensor array having a periodic pattern of conductive elements;
a suspension plate having a proof mass supported by a plurality of flexural elements capable of substantially constraining motion of said proof mass to a single axis with at least one intermediate frame positioned within and between said flexural elements, said flexural elements being predeflected when lying flat, whereby said proof mass is centered on said suspension plate when said suspension plate is at a "Galperin" orientation to a vertical axis;
a second capacitive sensor array positioned on a surface of said proof mass having a periodic pattern of conductive elements aligned in a common direction of periodicity parallel to said conductive elements in said first capacitive sensor array in separated opposition;
an electrical connection to said second capacitive sensor array on said proof mass allowing a coupling of cyclic excitations from external components through said periodic pattern of said second capacitive sensor array to said periodic pattern of said first capacitive sensor array, said coupling ranging between zero and one hundred percent and being a cycling positional measure of said proof mass with respect to said fixed plate; and
an electrical connection to said first capacitive sensor array transmitting a signal resulting from said coupling of said first capacitive sensor array to said second capacitive sensor array to external electronics, said external electronics determining the percentage of said coupling between the first capacitive sensor array and the second capacitive sensor array in order to transduce the position of said proof mass relative to said fixed plate.

2. The seismometer of claim 1, wherein said capacitive plate is comprised of insulating material.

3. The seismometer of claim 1, further comprising a sandwich of a fixed capacitive plate, a proof mass plate and a capping plate, wherein the thickness and material of said fixed capacitive plate and said capping plate are substantially identical.

4. The seismometer of claim 2, wherein said insulating material is glass.

5. The seismometer of claim 2, further comprising a differential displacement transducer pickup capacitor.

6. The seismometer of Claim 3, further comprising an additional capping plate on the back of said proof mass plate, said capping plate forming a protective enclosure around said periodic pattern of conductive elements on the surface of said proof mass plate, such that said fixed capacitive plate is on one side of said proof mass plate and said capping plate is on the other side of said proof mass plate.

7. The seismometer of claim 6, wherein said capping plate comprises at least one cavity, said cavity being formed by micro-abrasion with a protective mask.

8. The seismometer of claim 6, wherein said fixed capacitive plate comprises at least one channel for relieving a surface of said fixed capacitive plate unused for said first capacitive sensor array, said channel being formed by micro-abrasion with a protective mask.

9. The seismometer of claim 4, further comprising a high resistivity film positioned over said glass material to prevent static charge build up.

10. The seismometer of claim 3 fabricated in a batch fabrication as a wafer sandwich, whereby individual die are capable of being separated from said sandwich using controlled fracture of weakened supports formed by micro-abrasion in said fixed capacitive plate and said capping plate and thin supports formed by DRIE in said proof mass plate.

11. The seismometer of claim 1, wherein said capacitive plate is attached to said suspension plate by a plurality of solder balls of essentially the same diameter.

12. The seismometer of claim 1, further comprising an elastomeric connector having a plurality of wires, said plurality of wires contacting with a plurality of connection pads on said capacitive plate and with a plurality of connection points on said external electronics.

13. The seismometer of claim 12, wherein said wires are gold plated.

14. The seismometer of claim 12, wherein said elastomeric connector is positioned in a slot formed in said suspension plate.

15. The seismometer of claim 1, further comprising an additional electronic circuit, said electronic circuit being capable of compensating for variations in the heating power of said external electronics by injecting additional heating power into said external electronics.

16. The seismometer of claim 15, wherein said additional electronic circuit comprises a high frequency amplitude modulated alternating current (AC) carrier to maintain constant heating in said external electronics as the low frequency seismic signal varies.

17. The seismometer of claim 16, further comprising a digital control loop, said control loop being capable of compensating for external temperature variations maintaining the temperature of said seismometer.

18. The seismometer of claim 1, further comprising a plurality of interconnecting beams etched into said suspension plate, said plurality of interconnecting beams providing thermal isolation for said suspension plate.

19. The seismometer of claim 1, wherein said suspension plate is thermally isolated through vacuum sealing.

* * * * *